UNITED STATES PATENT OFFICE.

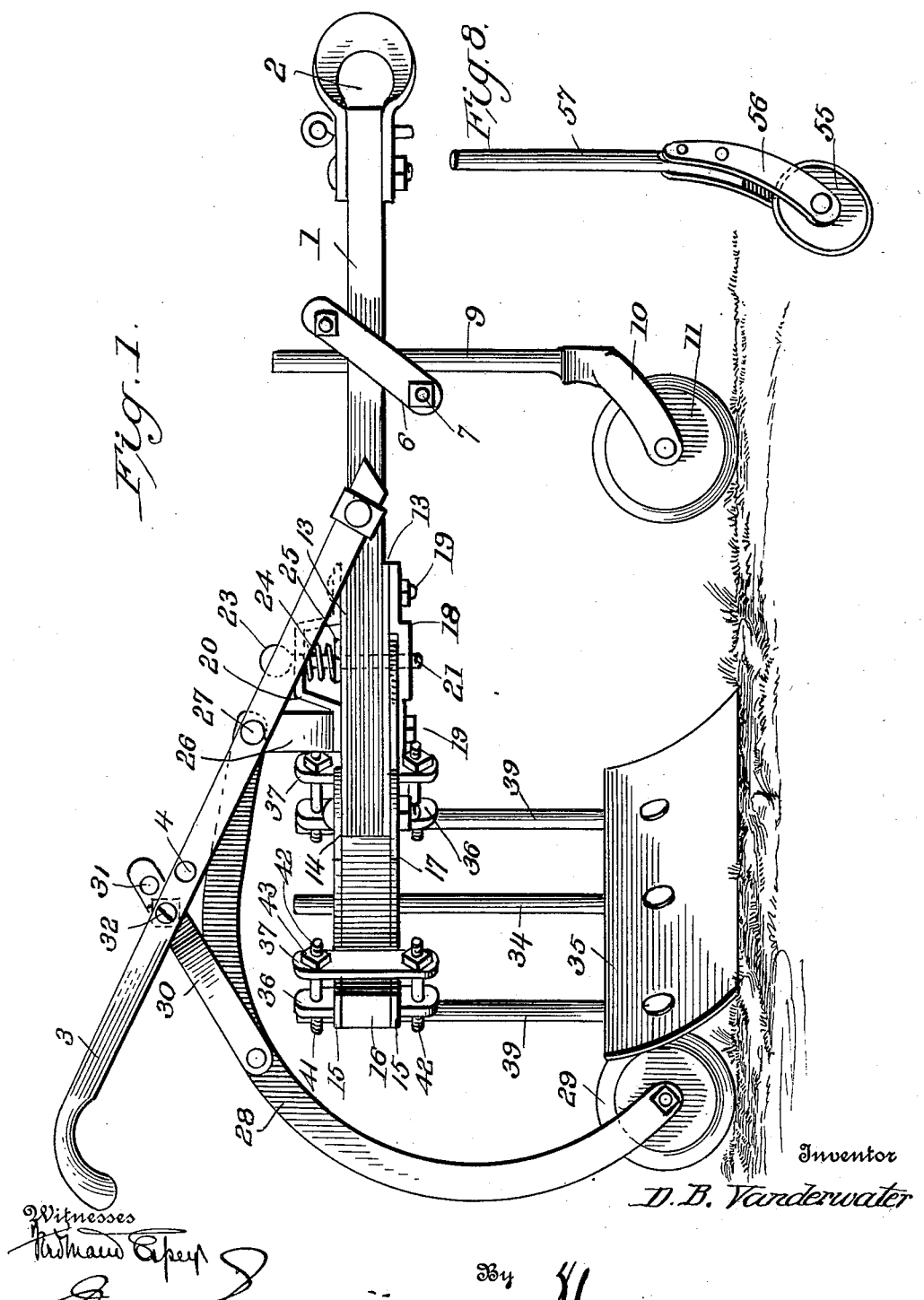

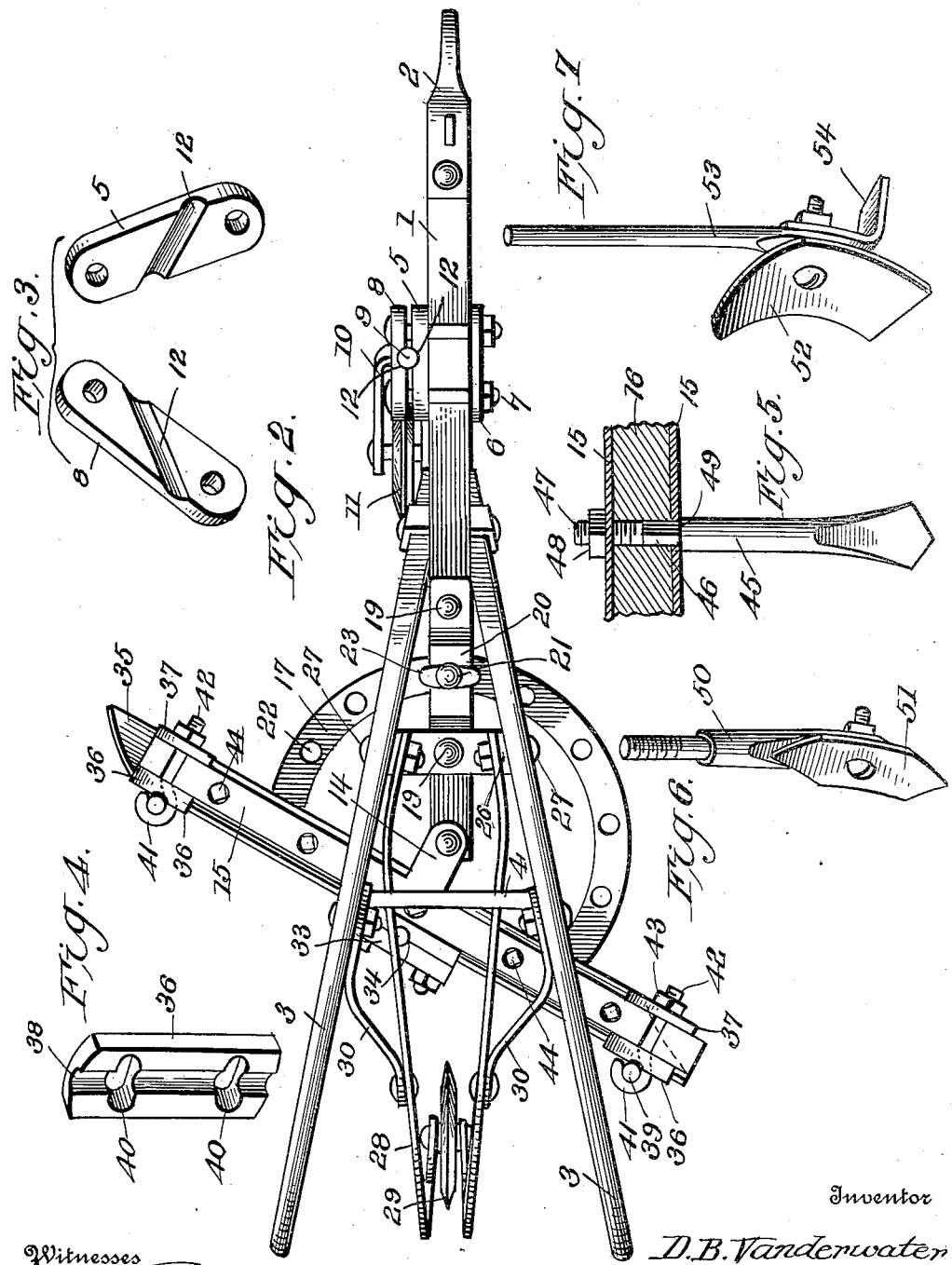

DANIEL B. VANDERWATER, OF LIBERTY, TEXAS.

AGRICULTURAL IMPLEMENT.

1,077,443.  Specification of Letters Patent.  Patented Nov. 4, 1913.

Application filed June 20, 1912. Serial No. 704,921.

*To all whom it may concern:*

Be it known that I, DANIEL B. VANDERWATER, citizen of the United States, residing at Liberty, in the county of Liberty and State of Texas, have invented certain new and useful Improvements in Agricultural Implements, of which the following is a specification.

This invention relates to ground treating implements, and has for its object the provision of a novel mounting for a colter whereby it will be held in line with the draft beam and aid in holding the soil-turning members to their work.

The invention is illustrated in the accompanying drawings, and will be hereinafter fully described, the novel features being pointed out more in detail in the claim following the description.

In the drawings:—Figure 1 is a side elevation of my improved device showing the same equipped with a scraper; Fig. 2 is a plan view of the same.

The draft beam, 1, is of the general form employed in this class of machinery and is equipped at its front end with a clevis for the attachment of the draft device. At an intermediate point of the draft beam, I secure the handles, 3, which diverge upwardly and rearwardly therefrom, as shown, and are braced by a cross bar or round 4 in the usual manner. Near the front end of the beam, I arrange, against the opposite sides thereof, clamping plates 5 and 6 through which fastening bolts 7 are inserted above and below the beam. Securing nuts are fitted upon the ends of the bolts and are adapted to be turned home against the plates 6, while a third clamping plate 8 is fitted upon the bolts between the heads of the same and the plate 5 to engage the shank, 9, of a yoke 10, in which a caster or roller 11 is journaled. The clamping plates 5 and 8 are provided in their opposed faces with obliquely disposed grooves adapted to receive the shank 9 and clamp the same firmly when the nuts are turned home upon the bolts 7, as will be readily understood. It will thus be seen that the roller will be securely held and the clamps will be securely fastened to the beam without requiring any mutilation and consequent weakening of the beam, and the caster may be adjusted vertically so as to permit the scraper or other implement to take into the ground to the desired extent without necessitating the removal of the clamp from the beam. Upon the upper and lower sides of the beam, at the rear end thereof, are secured reinforcing and wear plates 13, and to the rear extremity of the beam is pivoted the arm 14 projecting from the plate 15, which is secured upon the upper side of the cross beam or stock 16. From the front edge of the lower plate 15, a segmental plate 17 projects forwardly under the draft beam 1 and extends through a stirrup or keeper 18 which is secured to the underside of the draft beam, as clearly shown in Fig. 1. The bolts 19, by which this stirrup or keeper is secured to the draft beam, extend entirely through the said beam and serve to secure the wear plates 13 thereto, and also to secure upon the upper side of the beam a bracket or guide 20 in which is mounted a locking bolt or latch 21 extending through the said bracket and the beam to engage one of a series of perforations 22 in the fifth wheel and thereby hold the fifth wheel and the stock or cross beam 16 in the position to which they may have been adjusted. The locking bolt or latch 21 is provided with a T-head 23 to facilitate its manipulation, and a spring 24 is coiled around the said bolt between the bracket 20 and the stop 25 provided on the locking bolt, as clearly shown in Fig. 1. Braces 26 are secured to and rise from the rear end of the bracket 20 and have their ends secured to the handles 3, as shown, so as to support the handles and add to the rigidity of the structure. Pivotally mounted at their front ends upon the bolts 27, by which the braces are secured to the handles, are a pair of standards or hangers 28 which extend over the cross beam and down behind the same to support a colter 29 which will run directly in line with the draft beam. Links 30 are pivoted to the hangers or standards 28 and extend therefrom to the handles, the upper forward ends of the said links being provided with a series of perforations 31, through which bolts 32 may be inserted into the handles to secure the said links in a set position and permit the depth to which the colter may cut to be regulated.

Secured to the cross beam or stock 16, at the center thereof, are clamping plates 33 which engage the central shank or standard 34 which has its lower end secured to the scraper 35. At the ends of the said cross beam or stock, I provide the clamping plates 36 and 37 which fit against the rear and front faces of the said stock, respectively, the rear plate 36 having a central longitudinal groove to receive the shank or standard 39 secured to the scraper 35, adjacent the end thereof, as will be readily understood. The said clamping plate 36 is further provided with the transverse recesses which are adapted to receive the eyes 41 of eye-bolts 42 inserted through the clamping plates above and below the stock and equipped with nuts 43 adapted to be turned home against the front clamping plate 37, whereby the eyes 41 will be drawn into the recesses and the shank 39 consequently securely clamped in place. The scraper will thus be firmly secured at any desired height and will be so supported as to effectually resist any tendency to twist as the implement is drawn over the ground. The scraper is preferably set at an angle to the line of draft, as illustrated, in order that the dirt may be turned to one side instead of accumulating in front of the scraper, so that the progress of the implement over the field will not be impeded.

The cross beam or stock 16 is provided with a longitudinal series of vertical openings 44 which are adapted to receive the upper ends of harrow teeth standards or cultivators, so that the range of usefulness of the implement is very wide.

From the foregoing description, taken in connection with the accompanying drawings, it will be seen that I have provided an agricultural implement which may be provided at a low cost and by which a variety of conditions may be met and the soil treated in a number of ways without the use of a large number of draft beams and the parts immediately co-acting therewith. The openings 44 may receive the shanks of interchangeable ground treating implements and any one of the implements may be attached to or removed from the cross beam or stock in a few minutes. The cross beam or stock may be secured at any desired angle to the line of draft by merely lifting the locking bolt or latch 21 out of engagement with the segmental plate 17 and then turning the cross beam or stock to the desired position, whereupon, if the locking bolt be released, the spring 24 will at once depress the same so that it will engage the fifth wheel and hold the parts in the set position. If so desired, extensible or adjustable braces or connecting bars may be attached to the beam 1 and the ends of the stock 16 to strengthen the structure and relieve the strain on the locking bolt.

What I claim is:—

In an agricultural implement, the combination of a draft beam, a cross beam connected therewith, handles secured to the draft beam, arched standards secured to the handles and extending rearwardly over the cross beam and downwardly in rear thereof, and a colter carried by the lower ends of said standards in rear of the cross beam.

In testimony whereof I affix my signature in presence of two witnesses.

his
DANIEL B.  X  VANDERWATER [L. S.]
     mark

Witnesses:
 S. A. DE BLENE,
 JOSEPH RIVIERE.

---

Copies of this patent may be obtained for five cents each, by addressing the "Commissioner of Patents, Washington, D. C."